United States Patent
Keller et al.

(10) Patent No.: US 12,096,850 B2
(45) Date of Patent: Sep. 24, 2024

(54) CROSS-BRACE AND FURNITURE-ASSEMBLY KIT

(71) Applicant: VITRA AG, Birsfelden (CH)

(72) Inventors: Stefan Keller, Steinen-Hofen (DE); Helmut Schütt, Müllheim-Hügelheim (DE)

(73) Assignee: VITRA AG, Birsfelden (CH)

( * ) Notice: Subject to any disclaimer, the term of this patent is extended or adjusted under 35 U.S.C. 154(b) by 0 days.

(21) Appl. No.: 18/249,910

(22) PCT Filed: Oct. 22, 2021

(86) PCT No.: PCT/EP2021/079342
§ 371 (c)(1),
(2) Date: Apr. 20, 2023

(87) PCT Pub. No.: WO2022/084507
PCT Pub. Date: Apr. 28, 2022

(65) Prior Publication Data
US 2023/0389698 A1    Dec. 7, 2023

(30) Foreign Application Priority Data
Oct. 22, 2020   (CH) .................................... 01357/20

(51) Int. Cl.
*A47B 47/02*    (2006.01)
*F16B 12/32*    (2006.01)

(52) U.S. Cl.
CPC ............ *A47B 47/028* (2013.01); *F16B 12/32* (2013.01)

(58) Field of Classification Search
CPC .. E04G 7/34; E04G 7/32; E04G 7/307; Y10T 403/30; A47B 47/028; F16B 2/10; F16B 12/40; F16B 12/32
See application file for complete search history.

(56) References Cited

U.S. PATENT DOCUMENTS 2,619,390 A * 11/1952  Johnson .................. E04G 1/154
                                                      182/119
2,665,950 A *  1/1954  Johnson .................... F16B 7/22
                                                      182/115
(Continued)

FOREIGN PATENT DOCUMENTS

DE    102020132056 A1 *  6/2022
EP         0262090 A      3/1988
(Continued)

OTHER PUBLICATIONS

Written Opinion and International Search Report issued Jan. 31, 2022 in Intl Appl. No. PCT/EP2021/079342.

*Primary Examiner* — Patrick D Hawn
(74) *Attorney, Agent, or Firm* — MEDLER FERRO WOODHOUSE & MILLS PLLC

(57) ABSTRACT

A cross-brace is disclosed having an elongate rod portion and two claws, wherein a second grip-around portion of the claws can be moved relative to a first grip-around portion of the claws between an open position, in which a rod-form element is accommodated by the claws, or can be removed from the claws, and a closed position, in which the claws can grip around the rod-form element. The first and second grip-around portions are designed to grip around the rod-form element in the closed position in such a manner that a gap (S) remains between free ends of the first and second grip-around portions. Furthermore, the claws comprise an arresting mechanism, which is designed to keep the first and second grip-around portions in the closed position. A furniture-assembly kit having such a cross-brace is also disclosed.

19 Claims, 7 Drawing Sheets

(56) References Cited

U.S. PATENT DOCUMENTS

| | | | | |
|---|---|---|---|---|
| 2,845,307 | A * | 7/1958 | Holmes | E04G 7/308 410/144 |
| 4,632,221 | A * | 12/1986 | Stanford | E04G 7/14 403/49 |
| 4,715,474 | A * | 12/1987 | Wehmeyer | E04G 7/306 403/268 |
| 6,305,868 | B1 * | 10/2001 | Kinoshita | E04G 7/305 52/655.1 |
| 7,448,819 | B1 * | 11/2008 | Fu | E04G 7/16 403/49 |
| 7,954,598 | B2 * | 6/2011 | Wallther | E04G 7/301 182/113 |
| 8,668,402 | B2 * | 3/2014 | Mori | F16L 41/12 403/175 |
| 8,714,591 | B1 * | 5/2014 | Kobayashi | F16B 2/08 248/72 |
| 8,881,869 | B2 * | 11/2014 | Thacker | E04G 7/307 182/186.7 |
| 9,303,417 | B2 * | 4/2016 | Hayman | E04G 7/34 |
| 9,347,230 | B1 * | 5/2016 | Hayman | E04G 1/152 |
| 9,570,897 | B2 * | 2/2017 | Dobrinski | H02G 1/02 |
| 11,268,288 | B2 * | 3/2022 | Curtis | E04G 7/307 |
| 2011/0088973 | A1 * | 4/2011 | Shih | E04G 5/10 182/115 |
| 2012/0186910 | A1 * | 7/2012 | Thacker | E04G 7/307 182/151 |
| 2013/0126270 | A1 | 5/2013 | Darby | |
| 2014/0299413 | A1 * | 10/2014 | Hayman | E04G 7/34 182/186.8 |
| 2015/0108288 | A1 * | 4/2015 | Lee | F16B 12/54 248/68.1 |
| 2016/0201341 | A1 * | 7/2016 | Hayman | E04G 7/34 182/186.8 |
| 2016/0251864 | A1 * | 9/2016 | Hayman | E04G 5/061 403/246 |
| 2022/0408916 | A1 * | 12/2022 | Keller | E04G 7/34 |
| 2022/0412385 | A1 * | 12/2022 | Keller | A47B 87/0207 |
| 2023/0013163 | A1 * | 1/2023 | Keller | A47B 47/028 |

FOREIGN PATENT DOCUMENTS

| | | | | |
|---|---|---|---|---|
| GB | | 2291462 A | 1/1996 | |
| GB | | 2549691 A * | 11/2017 | B62H 3/12 |
| JP | WO2009057200 A1 * | | 3/2011 | F16B 12/40 |
| JP | WO2009057201 A1 * | | 3/2011 | F16B 12/40 |
| KR | | 200487459 Y1 * | 9/2018 | E04G 7/307 |
| WO | WO-2021084412 A1 * | | 5/2021 | E04G 5/16 |

* cited by examiner

CROSS-BRACE AND FURNITURE-ASSEMBLY KIT

TECHNICAL FIELD

The invention relates to a cross-brace and a furniture-assembly kit having such a cross-brace. The corresponding furniture-assembly kit can be used to assemble, disassemble and reconfigure pieces of furniture flexibly.

BACKGROUND

Flexible furniture-assembly systems, with which furniture can be variably assembled from basic components, are known. Variable furniture-assembly systems are widely used in warehouses or in offices where the furniture or the requirements for the furniture typically change from time to time.

Known variable furniture-assembly systems are based on a three-dimensional supporting tubular structure that can be constructed in different ways. For example, EP 0 262 090 A1 describes a furniture structure that has a plurality of tubes that can be connected via node elements. By means of the node elements, the tubes can be assembled in different ways in this system and, in particular, frames in different forms can be produced. The connected tubes can also be equipped with screens and plates that are mounted between the tubes.

Among other things, in modern office environments there is an increasing need to adapt furniture frequently and extensively. Known furniture-assembly systems are disadvantageous in this case despite their variability, because they have to be disassembled and re-assembled again. This modification is typically carried out by trained persons using special tools. This is necessary, among other things, for safety reasons, because the furniture-assembly system must ensure that furniture produced with it is sufficiently stable. Unstable furniture can pose a considerable risk to persons, in particular in the case of comparatively tall and/or heavily loaded furniture.

Since assembling, reassembling and disassembling furniture is time-consuming using the known furniture-assembly systems, as mentioned above, and can be a safety hazard if done improperly, it is nowadays often not necessary to adapt the furniture to changing needs. For example, in the case of open-plan office facilities in which it may be useful to adapt the furniture on a project-by-project basis, it is not necessary to make use of the variability of the furniture-assembly systems.

Furthermore, it has been found, in particular, that, in the case of known furniture-assembly systems, problems with tolerances often occur, if, for example, the rung or tube diameters are not always constant. The rungs or tubes can, on the one hand, have slight tapers, for example due to deformations. On the other hand, the rungs or tubes can have slight thickenings, for example due to powder coatings. In addition, the production-specific manufacturing tolerances of the tubes must be taken into account.

It is therefore an object of the present invention to propose a system or components for a system, by means of which flexible, stable and secure furniture can be produced and modified in a simple manner, virtually without tools, wherein, at the same time, practical variations in the rung or tube diameters can be compensated for.

BRIEF SUMMARY

The object is achieved according to the invention by a cross-brace and a furniture-assembly kit as described herein. Advantageous embodiments of the invention are also described herein.

The essence of the invention is as follows: A cross-brace having an elongate rod portion and two claws, wherein the rod portion has two substantially opposite longitudinal ends, wherein the two claws are in each case arranged on one of the two longitudinal ends of the rod portion. The two claws comprise a base having a longitudinal axis, a first grip-around portion extending from the base and having a free end, and a second grip-around portion extending from the base and having a free end and an arresting mechanism. The two claws are designed to grip around a rod-form element, wherein, in the case of each of the two claws, the second grip-around portion can be moved relative to the first grip-around portion between an open position, in which the rod-form element can be accommodated by the claw, or can be removed from the claw, and a closed position, in which the claw can grip around the rod-form element. The first grip-around portion and the second grip-around portion are designed here such that they grip around the rod-form element in the closed position in such a manner that a gap remains between the free end of the first grip-around portion and the free end of the second grip-around portion. The arresting mechanism is designed to hold the first grip-around portion and the second grip-around portion in the closed position or to press them into the closed position.

The cross-brace is a safety-relevant component and is provided in this way for product protection during assembly, disassembly or modification in such a way that the installation is carried out without tools and simple tools are required for removal.

The cross-brace can be provided to be installed in a piece of furniture and to stabilize it. In particular, in the case of a piece of furniture based on a three-dimensional tubular structure, such as a frame, the cross-brace can provide practical stability, such that the piece of furniture can absorb sufficient loads and can be securely installed during operation. Furthermore, the cross-brace can also be used in other tubular structures, in particular three-dimensional ones, such as stands for stabilization.

The rod portion may be a tubular or bar-like structure. It can be tubular with a hollow interior or in particular also solid. Solid rod portions can be particularly robust and portable.

The rod-form element can be a component or a portion of a component. For example, it can be a scaffolding tube. In particular, it can be a rung of a piece of furniture that is to be stabilized with the cross-brace.

By equipping the cross-brace with the claws and the arresting mechanism, it is possible to ensure that the rungs/tubes or the corresponding rod-form element are always almost completely surrounded and held firmly or securely even, in the case of variations in the tube diameter. In addition, rod-form elements or rungs can also be firmly held by the cross-brace when the cross-brace is oriented obliquely. The individual clamps rotate freely in each case and there is no positive locking. The two components, which comprise rod-form elements, can thus be reliably prevented from twisting (i.e., only in combination with at least two cross-braces and one horizontal tube or one cross-brace and two horizontal tubes). Accordingly, the cross-brace of a structure such as a three-dimensional tubular structure can provide sufficient stability to allow said structure to accommodate a relatively large load or other forces. The safety of the three-dimensional tubular structure or of a piece of furniture can thereby also be increased or ensured. At the same time, the claws or the arresting mechanism of the cross-brace also allow it to be installed efficiently (in particular in a virtually tool-free manner) and dismantled (in particular by means of a simple tool, such as an Allen key). As a result, a piece of furniture or another three-dimensional tubular structure can be efficiently assembled, modified and disassembled.

A gap remains between the free end of the first grip-around portion and the free end of the second grip-around portion in the closed position. In other words, the free ends of the first and second grip-around portions generally do not touch when the cross-brace is used as intended. However, a slight contact between the two free ends in the lowest tolerance range cannot be completely ruled out. However, the first and second grip-around portions and the arresting mechanism are regularly dimensioned or designed in such a way that, with regard to the dimensions of the rod-form elements to be gripped, some play always remains in the form of a gap, i.e., both in the region of the upper tolerance limit and in the region of the lower tolerance limit. It can thus be ensured that a sufficiently high holding torque always acts in particular on the movable second grip-around portion.

Preferably, the gap between the free end of the first grip-around portion and the free end of the second grip-around portion comprises between approximately 1% and approximately 20%, particularly preferably between approximately 2% and approximately 10%, of the circumference of the rod-form element (i.e., as seen in a cross section of the rod-form element). Experience has shown that particularly stable installation can be ensured in these size ranges of the gap.

In the case of each of the two claws, the first grip-around portion is preferably designed so as to be stationary relative to the base as a fixed grip-around portion. With further preference, the first grip-around portion is formed in one piece with a claw base. In this way, a stable and robust claw can be produced efficiently.

In the case of each of the two claws, the second grip around portion is preferably mounted on the base so as to be pivotable about a pivot axis. This creates the prerequisite for a simple and effective design of the arresting mechanism.

In the case of each of the two claws, the second grip-around portion preferably has a rear extension that, in the region of the base, can be pivoted about the pivot axis. As a result, it can be ensured that the arresting mechanism can be brought in a predefined manner from the closed position into the open position (and vice versa).

In the case of each of the two claws, the arresting mechanism in the closed position preferably presses on the rear extension of the second grip-around portion in such a way that a holding torque acts about the pivot axis in the direction of the closed position. Due to the lever effect produced therewith, the rod-form element is pressed securely from the second, movable grip-around portion to the first, stationary grip-around portion and held there, such that secure installation can always be ensured.

Preferably, in the case of each of the two claws, the arresting mechanism comprises (at least) one longitudinal opening formed in the base and an arresting element movably mounted in the longitudinal opening of the base, along with a spring element mounted on the base (e.g. a spring-mounted pressure pin), which spring element presses the arresting element toward a front end of the at least one longitudinal opening of the base. The longitudinal opening is preferably oriented along the longitudinal axis of the claws and is optionally offset somewhat parallel thereto. The front end of the longitudinal opening points approximately in the direction of the free ends of the first and second grip-around portions in the closed position. The rear end of the longitudinal opening points in the direction of the rear end of the claws, i.e., the fastening end of the claws for installation on the longitudinal ends of the rod portion.

In the case of each of the two claws, the arresting element of the arresting mechanism preferably has a pinion portion and a preferably cylindrical body portion. In this case, the pinion portions are formed in the form of approximately quarter gears, wherein their teeth can extend over an angular range of approximately 90° to approximately 135°. When the second grip-around portion is opened or closed, the cylindrical body portion is moved or rotated with the pinion portions and serves to block the rear extension of the second grip-around portion in the closed and also in the open position.

In the case of each of the two claws, the at least one longitudinal opening of the base preferably has a rack portion corresponding to the pinion portion of the arresting element. The rack portion is designed in such a way that the pinion portion or the arresting element can be brought from the rear end to the front end of the longitudinal opening and back with approximately a quarter turn, wherein the number of teeth of the pinion portion is preferably identical to the number of corresponding meshing openings of the rack portion.

In the case of each of the two claws, a support wall for the body portion of the arresting element is preferably provided on the base. In the closed position, the arresting element or the cylindrical body thereof is wedged between the support wall on the base and the rear extension of the second, movable grip-around portion by means of the compressive force of the pressure pin, wherein the holding torque is generated about the pivot axis. For this purpose, the rear extension of the second grip-around portion particularly preferably has a chamfer on its inner side facing the longitudinal axis in the closed position. In this case, the chamfer is designed to provide optimum wedging of the arresting element or optimum force transmission from the arresting element to the rear extension of the second grip-around portion.

In the case of each of the two claws, the arresting mechanism is preferably designed in such a way that, in the open position, a compressive force acts on the rear extension of the second grip-around portion in the open position thereof, such that the second grip-around portion is resiliently held in the open position. In this case, the arresting element or the cylindrical body thereof is not wedged between the rear extension and the support wall on the base, but rather presses the rear extension of the second grip-around portion against a (fixed) rear extension of the first, stationary grip-around portion, which optionally forms a receptacle for the latter.

In the case of each of the two claws, the first grip-around portion and the second grip-around portion can preferably be brought from the open position to the closed position without tools by pressing the arresting element counter to the compressive force (i.e., for example, the spring force of a spring element or a pressure pin) in the direction of the rear end of the longitudinal opening (for example manually during installation), thus clearing the way for pivoting the rear extension of the second grip-around portion past the arresting element from the open to the closed position.

In the case of each of the two claws, the rear extension of the second grip-around portion preferably has a chamfer on its outer side facing away from the longitudinal axis in the closed position. This chamfer on the outer side of the rear extension is in (spring) engagement with the arresting element or the cylindrical body thereof in the open position of the second, movable grip-around portion and is pressed back along the longitudinal opening during the closing process, such that the rear extension of the second grip-around portion can pivot into the closed position.

In the case of each of the two claws, the first grip-around portion is preferably designed to grip around more than half of the rod-form element. In the closed position, the gap between the free end of the first grip-around portion and the free end of the second grip-around portion is somewhat offset relative to the longitudinal axis of the claws. In this way, a particularly secure hold can be ensured for the rod-form element.

In the case of each of the two claws, the first grip-around portion and the second grip-around portion are preferably designed in such a way that they rest against the rod-form element at three contact points when the first grip-around portion and the second grip-around portion grip around the rod-form element and are in the closed position. The three contact points are preferably arranged at a substantially regular distance from the first and second grip-around portions. Further preferably, two contact points are provided on the stationary first grip-around portion and one contact point is provided on the second movable grip-around portion. In any case, the three contact points allow the rod-form element to be held efficiently and precisely. In addition, it is possible to prevent the rod-form element from tilting toward the claw.

Preferably, the arresting element has a tool holder for actuating the arresting mechanism from the closed position to the open position. Thus, for example, an Allen wrench can be used to rotate the arresting element back along the longitudinal opening in order to clear the way for the rear extension of the second grip-around portion, so that it can be pivoted back to the open position. After the Allen wrench has been released, the arresting element is then pushed forward again along the longitudinal opening by means of the spring element or the pressure pin, where it resiliently holds the rear extension of the second grip-around portion in the open position, wherein the rear extension of the second grip-around portion is pressed against the rear extension of the first grip-around portion or into a receptacle of the latter.

A further aspect of the present invention consists of a furniture-assembly kit having a set of floor ladders, each of which comprises two vertical supports connected to one another via an upper rung and a lower rung, wherein the two vertical supports are each equipped with a foot for positioning on a floor, a set of longitudinal cross members, each of which is equipped at its longitudinal ends with a snap-on claw that is designed to be installed on one of the rungs of one of the floor ladders without tools. The furniture-assembly kit also comprises a cross-brace according to the invention, wherein the claws of the cross-brace are in each case designed such that one of the rungs of the floor ladders or one of the cross members is the rod-form element.

The furniture-assembly kit can be provided for the purpose of flexibly configuring different pieces of furniture from the same components as required. Such furniture can be tables, racks or shelves, for example. In particular, the furniture can be office furniture.

The term "kit" in connection with the furniture-assembly kit and its floor ladders, cross members and wind bracings refers to a plurality of elements or components. For example, the set of floor ladders comprises two or more floor ladders.

Besides the upper and the lower rung, the floor ladders can also comprise further rungs. Typically, the vertical supports and the rungs are substantially rod-shaped. In particular, the rungs, but also the vertical supports, can have a substantially round or circular cross section. The vertical supports and the rungs of a floor ladder can in each case be virtually perpendicular to one another, such that the rungs run parallel to one another and the vertical supports run parallel to one another.

The vertical supports of the floor ladders can be formed over long distances as rod profiles or, for example, as round or rectangular tubes. They are typically produced from a robust material such as a metal. The vertical supports of a floor ladder advantageously run parallel to one another.

The rungs of the floor ladders can likewise be formed over long distances as rod profiles or tubes. They advantageously have a circumference with a virtually circular cross section. The upper and lower rungs are advantageously oriented horizontally and run parallel to one another during operation.

The feet of the floor ladders can be designed as glides, for example. If the furniture made from the furniture-assembly kit is intended to be moved frequently, it is also possible to use castors as feet of the floor ladders.

The cross members are advantageously designed longitudinally, such that they extend between two rungs of the same height of the first of the floor ladders and that of the second of the floor ladders when they are installed thereon. At the same time, the cross-brace can be designed to be installable on the top of the first of the floor ladders and the bottom of the second of the floor ladders, while one of the cross members is mounted on the top rung of the first of the floor ladders and on the top rung of the second of the floor ladders. As a result, the cross-brace can be connected to the floor ladders at an angle or diagonally, while the cross members are connected to the floor ladders horizontally.

Alternatively, the cross-brace can also be connected horizontally to the rungs of the floor ladders or other rungs. This can take place in particular if a corresponding dimension in the furniture is desired.

The effects and advantages explained above in connection with the cross-brace according to the invention can be efficiently implemented with the furniture-assembly kit according to the invention.

BRIEF DESCRIPTION OF THE DRAWINGS

Further advantageous embodiments of the invention emerge from the following description of exemplary embodiments of the invention with the aid of the schematic drawing. In particular, the cross-brace according to the invention and the furniture-assembly kit according to the invention will be described in more detail below with reference to the accompanying drawings by means of exemplary embodiments.

DETAILED DESCRIPTION OF EMBODIMENTS OF THE INVENTION

Figure 1:
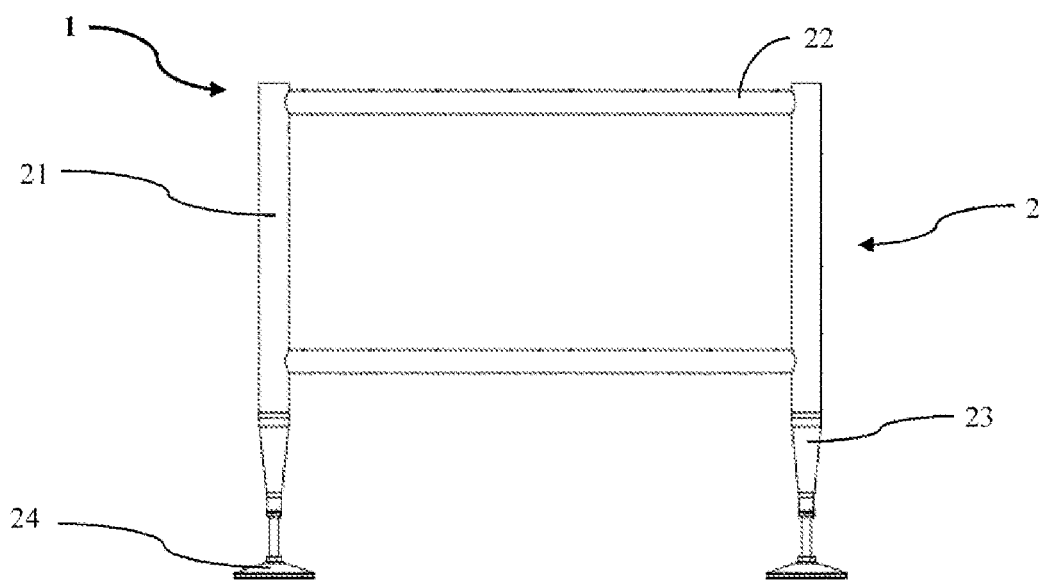
FIG. 1 is a front view of a floor ladder of an exemplary embodiment of a furniture-assembly kit according to the invention.

Certain expressions are used in the following description for practical reasons and are not to be understood as limiting. The words "right," "left," "bottom" and "top" denote directions in the drawing to which reference is made. The expressions "inward," "outward," "below," "above," "on the left," "on the right" or the like are used to describe the arrangement of designated parts relative to one another, the movement of designated parts relative to one another and the directions toward or away from the geometric center of the invention and designated parts thereof as shown in the figures. This spatial relative information also comprises other positions and orientations than those shown in the figures. For example, when a part shown in the figure is inverted, elements or features that are described as "below" are then "above." The terminology comprises the words expressly mentioned above, their derivations and words with similar meanings.

In order to avoid repetition in the figures and the associated description of the various aspects and exemplary embodiments, certain features are to be understood collectively for different aspects and exemplary embodiments. The omission of an aspect in the description or in a figure does not suggest that this aspect is lacking in the associated exemplary embodiment. Rather, such omissions are made for the sake of clarity and to avoid repetition. In this connection, the following stipulations apply to the entire remainder of the description: If, for purposes of clarity in the drawing, a figure contains reference signs, but these are not mentioned in the text of the description relating directly thereto, reference is made to their explanation in preceding figure description. If reference signs are also mentioned in the text of the description relating directly to a figure that are not included in the corresponding figure, reference is made to the preceding and following figures. Similar reference signs in two or more figures represent similar or identical elements.

FIG. 1 shows a floor ladder 2 of a set of floor ladders 2 of an exemplary embodiment of a furniture-assembly kit 1 according to the invention. The floor ladder 2 is designed as a first component of an exemplary embodiment of a tube connection structure according to the invention. It consists of two parallel vertical supports 21, which are connected to one another by two horizontal rungs 22. The rungs 22 are designed as straight tubes having a circular cross section. They are at a right angle to the vertical supports 21 and are firmly connected, for example welded, thereto. The vertical supports 21 are likewise designed for the most part as straight tubes having a circular cross section and extend downward in each case into a tapering foot 23. The two feet 23 are each equipped with a glide 24 that is arranged for positioning the floor ladder 2 on a floor.

Figure 2:
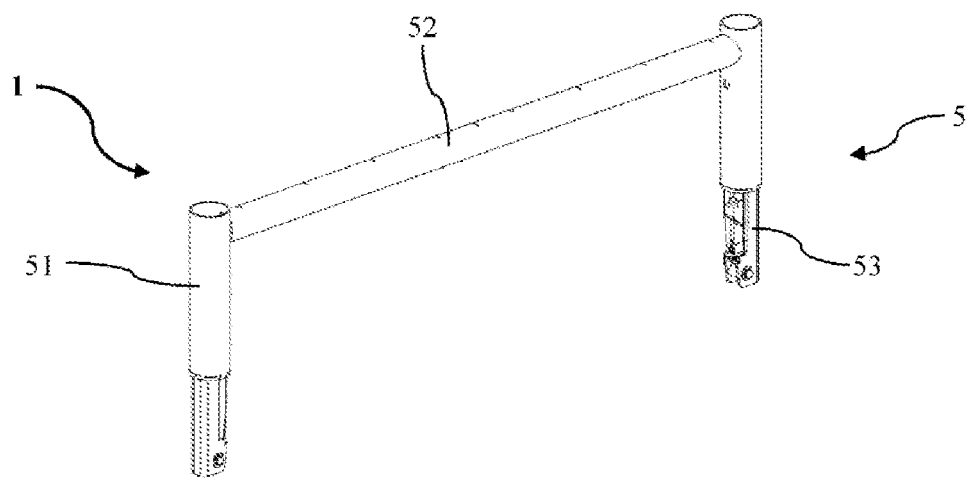
FIG. 2 is a front view of a floor ladder of the furniture-assembly kit of FIG. 1.

FIG. 2 shows a single-rung assembly ladder 5 of a set of assembly ladders 5 of the furniture-assembly kit 1. The assembly ladder 5 is designed as a second component of an exemplary embodiment of a tube connection structure according to the invention. It comprises two tubular vertical supports 51, which are fixedly connected to one another via a tubular rung 52. Together, the vertical supports 51 and the rung 52 are virtually U-shaped. The rungs 52 of the assembly ladder are dimensioned identically to the rungs 22 of the floor ladder 2 of FIG. 1, such that the assembly ladder 5 matches the floor ladder 2.

A tube connector 7 of the tube connection structure extends vertically downwards from the lower ends of the vertical supports 51 of the assembly ladder 5. The tube connectors 7 are designed such that they can be inserted into the vertical supports 21 of the floor ladder 2 or into vertical supports 51 of a further assembly ladder 5 and, when actuated, fix the connected vertical supports 21, 51 to one another.

In addition to the assembly ladder 5, as shown in FIG. 2, the set of assembly ladders 5 of the furniture-assembly kit 1 comprises further assembly ladders having vertical supports connected via two parallel rungs. In comparison to the single-rung embodiment of FIG. 2, these assembly ladders are designed to be longer or higher.

Figure 3:
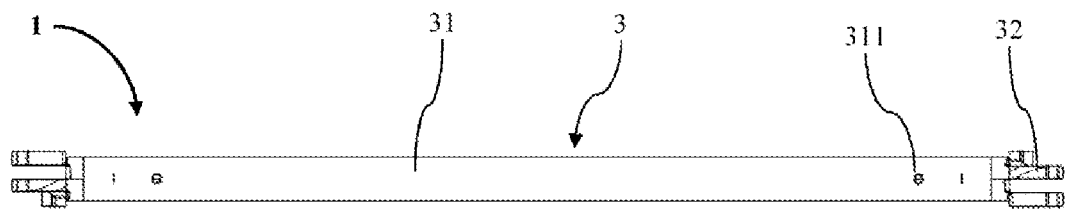
FIG. 3 is a view from above of a cross member of the furniture-assembly kit of FIG. 1.

FIG. 3 shows a cross member 3 of a set of cross members 3 of the furniture-assembly kit 1. The cross member 3 is formed from a longitudinal rod portion 31 and snap-on claws 32 extending outward from the longitudinal ends of the rod portion 31 to the left or right. The rod section 31 is formed from a tube having a circular diameter that corresponds to the diameter of the rung 52 of the assembly ladder 5 and the rungs 22 of the floor ladder 2. On its upper side, the rod portion 31 is equipped in each case with a bore 311 near each of its longitudinal ends as a female plug part. The snap-on claws 32 each comprise a rung receptacle 321 as the grip-around portion.

The rod portion 31 of the cross member 3 has a central longitudinal axis 33 that extends through the center point of the circular cross section of the rod portion 31. As can be seen in FIG. 3, the rung receptacle 321 of the left snap-on claw 32 is offset from the rung receptacle 321 of the right snap-on claw 32 with respect to the central longitudinal axis 33 of the rod portion 31. In particular, in FIG. 3, the rung receptacle 321 of the left snap-on claw 32 is offset upward with respect to the central longitudinal axis 33, and the rung receptacle 321 of the right snap-on claw 32 is offset downward with respect to the central longitudinal axis 33.

Figure 4:
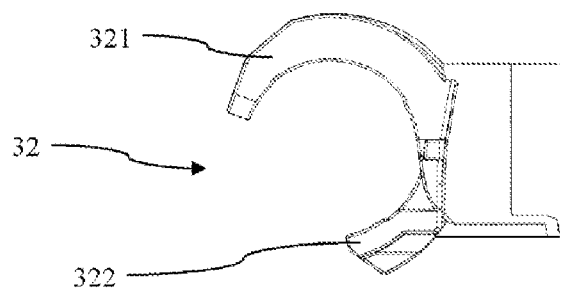
FIG. 4 is a side view of a snap-on claw of the cross member of FIG. 3.

FIG. 4 shows, by way of example, the left of the two snap-on claws 32 of the cross member 3 of FIG. 3. It can be seen here that the snap-on claw 32 has an upper rung receptacle 321, which is formed in one piece with a base, and a lower slider 322. The rung receptacle 321 has an almost semi-circular or semi-annular inner surface, which is formed in a manner substantially corresponding to the rungs 22, 52 of the floor and assembly ladders 2, 5. In an analogous manner, the slider 322 is equipped with an inner surface that is approximately quarter-circle or quadrant-shaped and is likewise formed in a manner substantially corresponding to the rungs 22, 52 of the floor and assembly ladders 2, 5. Three contact curvatures are distributed uniformly along the circumference on the inner surfaces of the rung receptacle 321 and the slider 322.

The slider 322 extends through a guide slot in the base, such that it can be displaced to the left and right of the base within a predefined range. In the interior of the base, the snap-on claw 32 is equipped with a spring that pushes the slider 322 as far to the left as possible into the position shown in FIG. 4. In this blocking position, the snap-on claw 32 is snapped to a rung 22, 52 or a rod portion 31 of another cross member 3 when the rung receptacle 321 and the slider 322 receive said rung or rod portion. The cross member 3 is then installed on the rung 22, 52 or the rod portion 31. In particular, the rung 22, 52 rests on the three contact curvatures in the sense of a three-point connection, such that the rung 22, 52 or the rod portion 31 is held securely and tilting can be prevented.

To release the snap-on claw 32, the slider 322 is pushed, for example, manually against the spring force. As a result, the snap-on claw 32 is opened and the cross member 3 can be removed from the rung 22, 52 upward.

To install the cross member 3 on a rung 22, 52 or on a rod portion 31 of another cross member 3, the snap-on claw 32 is pressed from above onto the rung 22, 52 or the rod portion 31. Due to the chamfered or angled lower side of the slider 322, said slider is pushed to the right against the spring force, such that the rung receptacle 321 can receive the rung 22, 52 or the rod portion 31. Driven by the spring, the slider 322 then snaps back below the rung 22, 52 or the rod portion 31, such that secure fastening is achieved.

Figure 5:
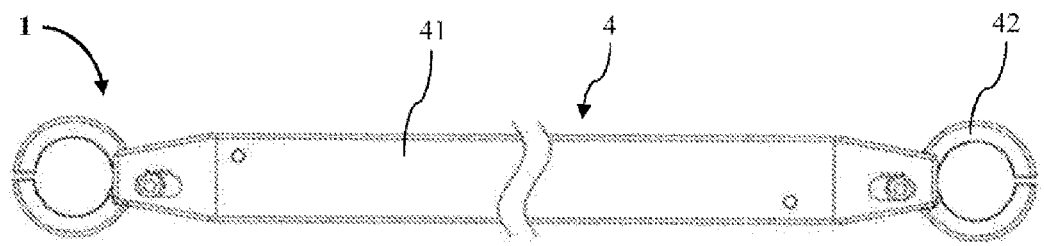
FIG. 5 is a view from above of a cross-brace according to the invention.

FIG. 5 shows an exemplary embodiment of a cross-brace 4 according to the invention of a set of cross-braces 4 of the furniture-assembly kit 1. The cross-brace 4 has an elongated rod portion 41, which merges into a claw 42 at its longitudinal ends. As can be seen in conjunction with FIGS. 6 and 6a, the rod portion 41 is designed as a solid square rod with a rectangular cross section. Due to the solid design, the cross-brace 4 can be particularly robust and designed to absorb comparatively large forces or loads.

Figure 6:
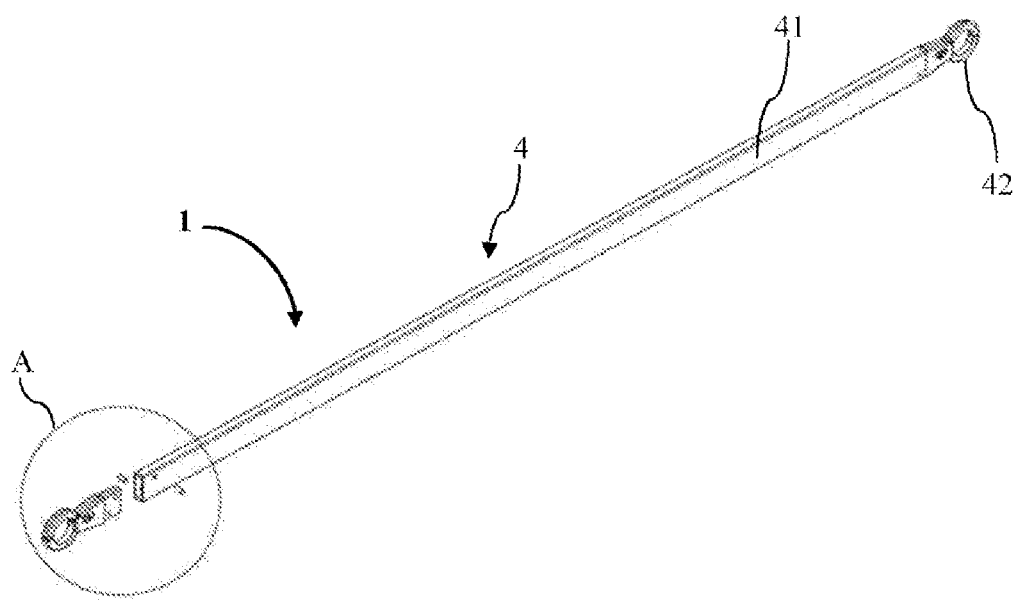
FIG. 6 is a perspective view of a cross-brace according to FIG. 5.
Figure 6A:
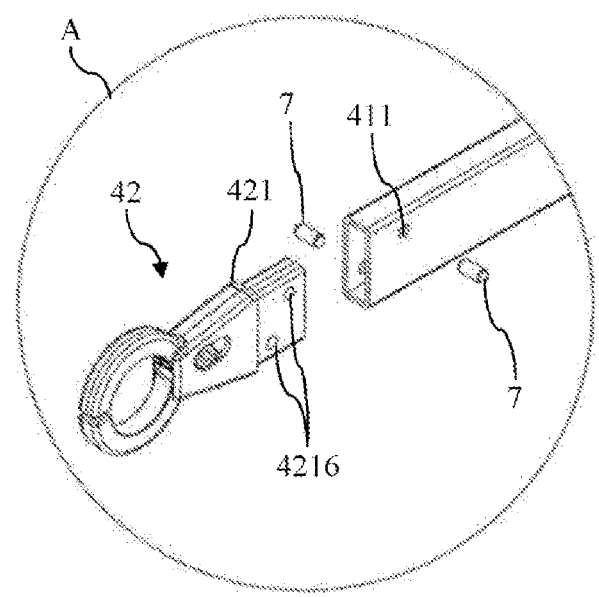
FIG. 6*a* is a detail view with respect to the fastening of a claw according to the invention to the rod portion of the cross-brace according to FIG. 5.

FIG. 6a illustrates the detail view A according to FIG. 6. In particular, the installation of the claw 42 on the elongated rod portion 41 is illustrated. In this case, the fastening portion of the claw base 421 containing the fastening openings 4215 can be inserted into the hollow rod portion 41 with the corresponding fastening openings 4115 and installed by means of two fastening means 7 (for example screws or pins). However, other connections such as form-fitting pressing, gluing, welding, etc. can also be provided.

Figure 7:
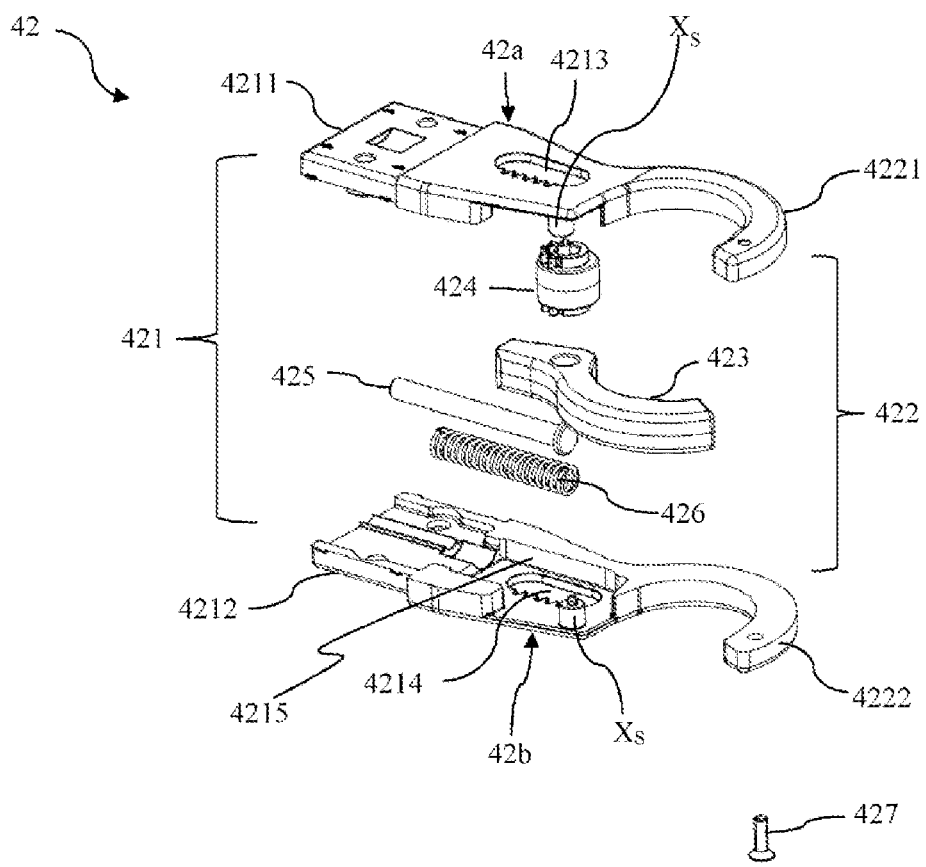
FIG. 7 is an exploded view of a claw of a cross-brace according to the invention.

FIG. 7 shows an exploded view of an exemplary claw 42 for a cross-brace 4 according to the invention, which claw comprises an upper side 42a and an lower side 42b. The upper side 42a and the lower side 42b are plate-shaped and substantially correspond to one another. The upper side 42a comprises a fastening portion 4211, a longitudinal opening 4213 and the upper side 4221 of a first grip-around portion. The lower side 42b comprises a fastening portion 4212, a longitudinal opening 4214 and the lower side 4222 of a first grip-around portion. The plate-shaped upper side 42a and the plate-shaped lower side 42b together form the base 421 of the claw 42.

Between the upper side 42a and the lower side 42b, it is possible to see separate components of the claw 42, namely firstly an arresting element 424, which in the installed state is guided into the longitudinal openings 4213 and 4214. Below this, the second grip-around portion 423, which is regularly formed in one piece, can be seen and can, in the installed state, be pivoted about the pivot axis $X_S$ relative to the first grip-around portion 422.

Below this, a pressure pin 425 having a pressure head 4521 and a spring 426 can be seen. In the installed state, these two components are mounted in the base 421 such that they can exert a compressive force on the arresting element 424. The upper side 4211 of the first grip-around portion 422 and the lower side 4222 of the first grip-around portion 4221 are regularly fastened to one another by means of a fastening means 427 (for example a screw or a pin). The base 421 also has a support wall 4215 for the arresting element 424.

Figure 8:
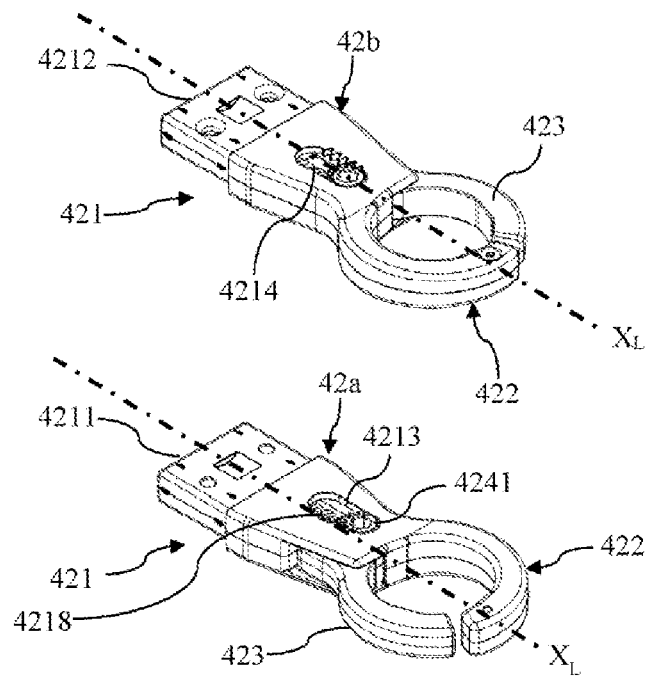
FIG. 8 is a perspective view of the top and lower side of the claw according to FIG. 7.

In FIG. 8, a claw 42 according to the invention is illustrated in the installed state, once with the lower side 42b upward and once with the upper side 42a upward. It can be seen in particular that the first grip-around portion 422 in each case makes up more than half of the circumference to be gripped of a corresponding rod element (not shown), such that the first grip-around portion 422 and the second grip-around portion 421 in this embodiment are not symmetrical with respect to the longitudinal axis $X_L$ of the claw 42. The arrangement of the longitudinal openings 4213 and 4214 is also somewhat offset with respect to the longitudinal axis $X_L$ of the claw 42.

Figure 9:
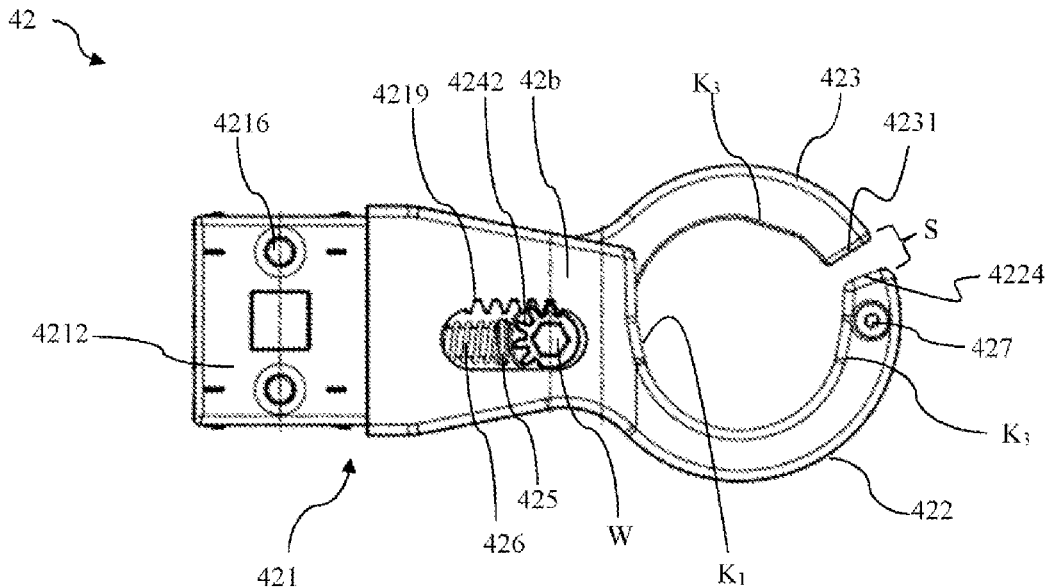
FIG. 9 is a view from above of the lower side of the claw of FIG. 7 in the closed position.

FIG. 9 illustrates a view from above of the lower side 42b of the claw 42 in its closed position. In this case, the fastening portion 4212 having the fastening openings 4216 for installation on the rod portion 41 extends in the rear direction from the base 421 of the claw 42 by means of the fastening means 7, as shown in FIG. 6a. The base 421 comprises the longitudinal opening 4212 having the rack portion 4219. Within the longitudinal opening 4212, the pressure pin 425 is seen with the spring 426. The pressure pin 425 rests against the arresting element 424.

The pinion portion 4242 is arranged on the lower side of the arresting element 424, the teeth of which are in engagement with the opposite notches in the rack 4219 of the longitudinal opening 4214; in this case, the pinion portion 4242 is designed, for example, in the form of a quarter pinion having five teeth in the embodiment shown. The same also applies to the embodiment of the upper side, wherein it is also conceivable in principle to provide only one longitudinal opening with only one pinion portion mounted movably therein, i.e., either on the upper side 42a or on the lower side 42b. Furthermore, a tool interface W (in this case, for example, for an Allen wrench) is also located on the pinion portion 4242. The first and second grip-around portions 422 and 423 protrude from the base 421.

In this case, the first grip-around portion 422 is designed as a fixed grip-around portion that is stationary relative to the base 421 and is regularly also designed in one piece therewith. The first grip-around portion 422 preferably comprises a first contact point $K_1$ in the region of the base 412 and a second contact point $K_2$ in the region shortly in front of its free end 4224. The second grip-around portion 423 is mounted on the base 421 as a movable grip-around portion so as to be pivotable relative to the first grip-around portion 422. The second grip-around portion 423 preferably comprises a third contact point $K_3$ in the region shortly in front of its free end 4231. The three contact points $K_1$, $K_2$ and $K_3$ are each formed as slight curvatures along the inner circumference of the two grip-around portions 422 and 423 and are preferably uniformly spaced.

The first grip-around portion 422 and the second grip-around portion 423 together form a circular or annular passage, in which a rod-form element or one of the rungs 22, 52 of the floor or assembly ladders 2, 5 can be arranged. If one of the rungs 22, 52 is now arranged in the passage, it abuts the contact points $K_1$, $K_2$ and $K_3$ of the grip-around portions 422, 423. As a result, the rung 22, 52 is held securely in the claw 42 in the sense of a three-point connection. Between the free ends 4224 and 4231 of the two grip-around portions, there remains in particular a gap S, the width of which depends on the tolerance deviations of the respective rungs 22, 52 or tubes.

The two grip-around portions 422 and 423 are preferably designed such that they can reliably cover a tolerance range of at least ±0.5 mm, for example in the case of a rung or tube diameter of approximately 35 mm. That is to say, in the case of a typical rung or tube diameter of 35.0 mm, the gap has its normal width. In the case of an actual rung or tube diameter of approximately 35.5 mm, the width of the gap S increases relative to the normal width and, in the case of an actual rung or tune diameter of approximately 34.5 mm, the width of the gap S decreases relative to the normal width. In the closed position shown, with no rung or tube, the width of the gap S is the smallest.

In practice, the gap S remaining between the free ends 4231 and 4224 of the two grip-around portions 422 and 423 can comprise between approximately 1% and approximately 20%, preferably between approximately 2% and approximately 15% of the circumference of the rod-form element or the respective rungs 22, 52 or tubes.

Figure 10:
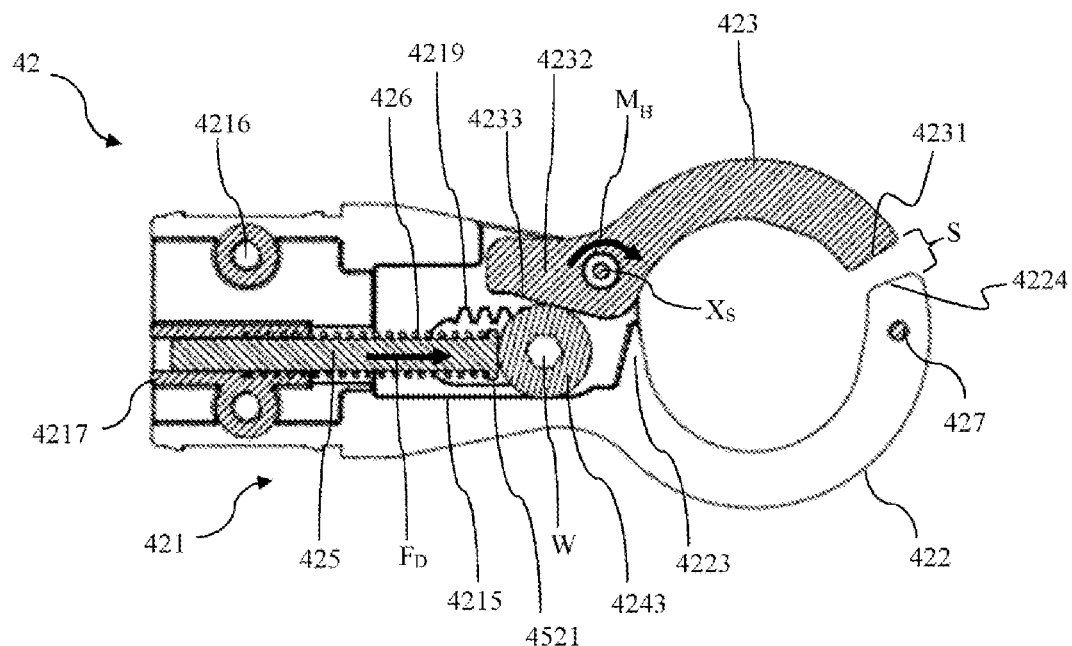
FIG. 10 is a partial sectional view of the claw of FIG. 9 in the closed position.

FIG. 10 shows a partial sectional view of the claw of FIG. 9. Based on this illustration, the mode of operation of the arresting mechanism starting from the closed position will be explained below in conjunction with the preceding figures.

As can be seen, the second grip-around portion 423 has a rear extension 4232 that is mounted in the region of the base 421s so as to be pivotable about the pivot axis $X_S$. In the closed position of the arresting mechanism, however, the rear extension 4232 of the second grip-around portion 423 is pressed on such that a holding torque $M_H$ is generated about the pivot axis $X_S$ in the direction of the closed position (see arrow), which holding torque is designed such that the claw 42 can always ensure stable installation within the scope of the given tolerance limits. To this end, the arresting mechanism comprises the longitudinal openings 4213 and 4214 formed in the base 421 and the arresting element 424 movably mounted in the openings via the pinion portions 4241 and 4242 and the corresponding racks 4218 and 4219. The arresting element 424 has a cylindrical body portion 4243 between its two pinion portions.

In the present case, the spring element 425 mounted on the base 421 in the bearing portion 4217 acts on this cylindrical body portion 4243. The spring element 425 is usually designed in the form of a pressure pin having a pressure head 4521. A spring 426, which is supported in the bearing portion 4217 of the base 412, extends up to the lower side of the pressure head 4521 and thus ensures that the pressure pin is resiliently mounted on the base 421. In the closed position shown, the pressure pin 425 presses the cylindrical body portion 4243 of the arresting element 424 with a compressive force $F_D$ (see arrow) toward the front end of the longitudinal opening 4214, wherein the cylindrical body portion 4243 is wedged between a support wall 4215 of the base 421 and the inner side of the rear extension 4232 of the second grip-around portion 423.

A lateral force component of the compressive force $F_D$ then acts on the chamfer 4233 on the inner side of the rear extension 4232 of the second grip-around portion 423, such that the holding torque $M_H$ is generated. The chamfer 4233 is geometrically designed or arranged in such a way that the lateral force component of the compressive force $F_D$ can be optimally transmitted to the rear extension 4232. The rear extension 423 is generally acute-angled with respect to the longitudinal axis $X_L$ of the claw (see FIG. 8).

In the closed position, the claw 42 cannot (and may not) be opened without the use of a tool. In this case, an Allen wrench must be inserted into the tool holder W of the pinion portion 4242 in order to rotate the arresting element 424 in the longitudinal opening 4214 against the force of the spring 426 from the front position at the front end of the longitudinal openings (i.e., the end facing the free ends 4224 and 4231 of the grip-around portions 422 and 423) to the rear position at the rear end of the longitudinal openings (i.e., the end facing the rod portion 41). In this way, the way for the rear extension 4232 of the second grip-around portion 423 is cleared, such that the second grip-around portion 423 can be pivoted back from the closed position to the open position, such that a corresponding rung 52 or tube can be removed from the claw 42.

Figure 11:
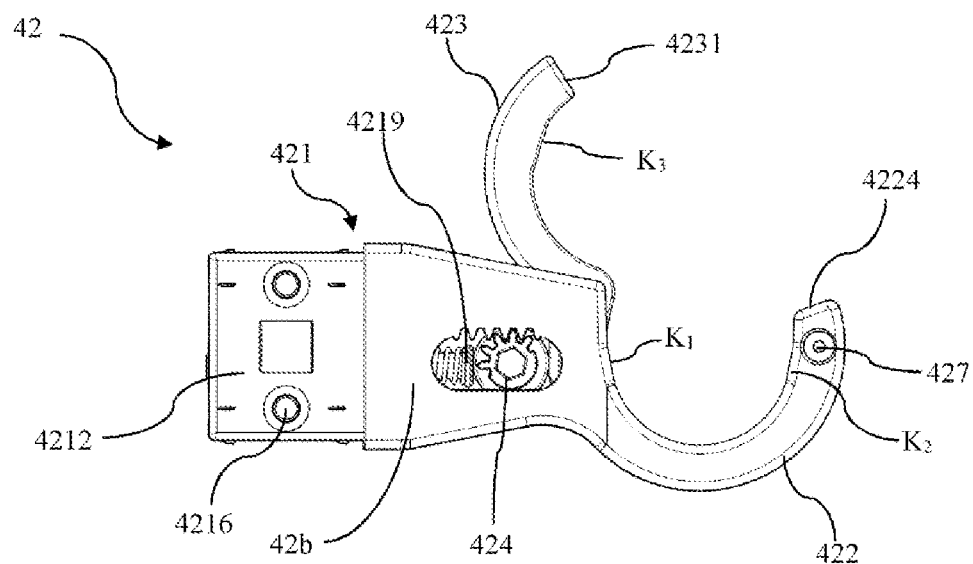
FIG. 11 is a view from above of the lower side of the claw of FIG. 7 in the open position.
Figure 12:
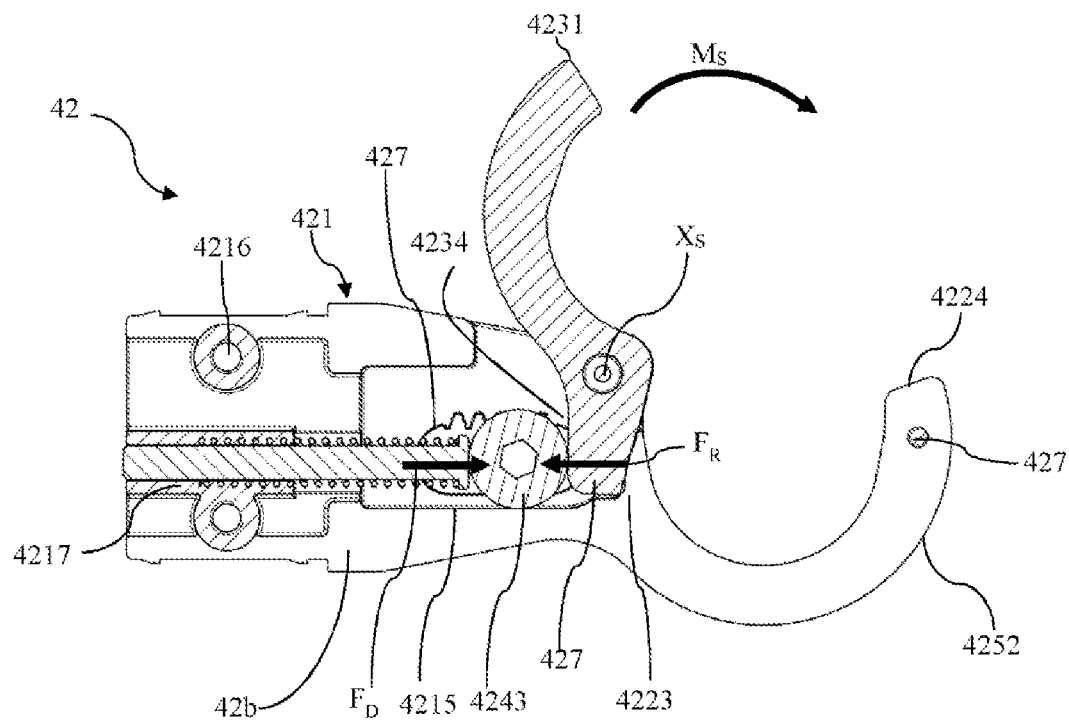
FIG. 12 is a partial sectional view of the claw of FIG. 11 in the open position.

The functioning of the arresting mechanism with respect to the open position and a corresponding closing process from the open position back to the closed position is explained below with reference to FIGS. 11 and 12, in conjunction with the preceding figures.

In the open position of the arresting mechanism, the pressure pin 425 or its pressure head 4521 in turn exerts the compressive force $F_D$ on the cylindrical body portion 4243 of the arresting element 424 and presses it toward the front end of the longitudinal opening. The cylindrical body portion 4243 now transmits the pressure to an outer chamfer 4234 of the rear extension 4232 of the second grip-around portion 423. In this case, the rear extension 4232 of the second grip-around portion is pressed against a rear extension 4223 of the first grip-around portion 422. The rear extension 4223 of the first grip-around portion 422 is designed in such a way that it receives the rear extension 4232 of the second grip-around portion in such a way that it is oriented approximately at right angles to the longitudinal axis $X_L$ of the claw (see FIG. 8). The rear extension 4232 of the second grip-around portion 423 is thus held resiliently in the open position.

In order now to transfer the claw 42 or the second grip-around portion 423 to the closed position again for installation, a user can manually (i.e., in particular, without tools) apply a closing torque to the second grip-around portion 423 or the free end 4231 thereof, such that the rear extension 4232 of the second grip-around portion 423 can pivot back about the pivot axis $X_S$. In this regard, the rear extension 423 has an outer chamfer 4234 on its outer side, which chamfer is designed such that a restoring force $F_R$ acting substantially opposite to the pressing force $F_D$ can be applied to the arresting element 424 or the cylindrical body portion 4243 thereof. During the closing process, the rear extension 423 of the second grip-around portion 423 thus always remains resiliently in contact with the cylindrical body portion 4243 of the arresting element 424 until it is moved past the latter into the closed position according to FIG. 10 (i.e., the cylindrical body portion 4243 rolls off the rear extension 423, so to speak). At this moment, the arresting element 424 is again pushed forward along the inner chamfer 4233 of the rear extension 4232 of the second grip-around portion 423 and the support wall 4215 of the base 421, wherein the pinion portion 4242 in the rack portion 4219 correspondingly moves into the forward position.

Figure 13:
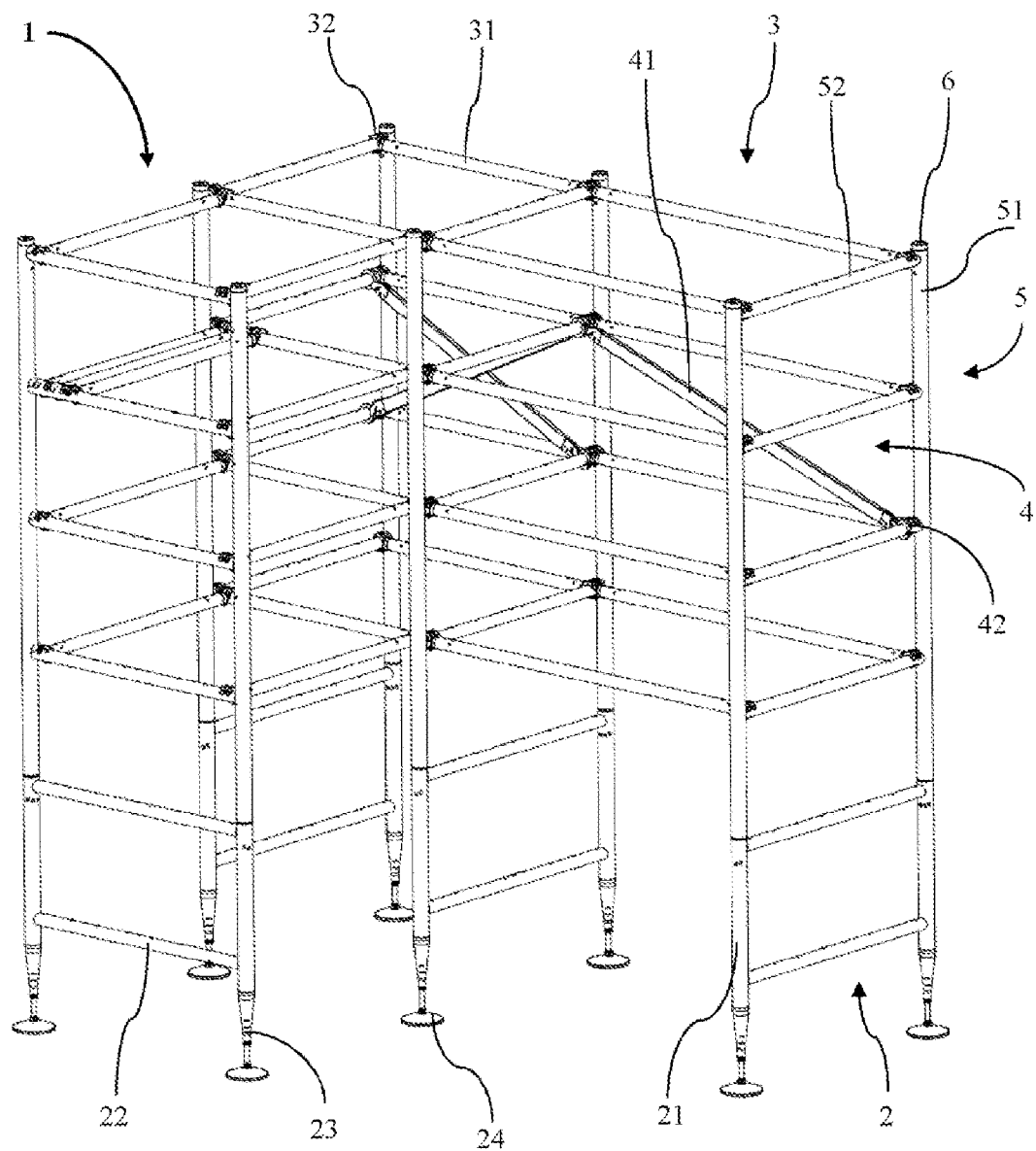
FIG. 13 is a perspective view of a frame structure constructed from the furniture-assembly kit of FIG. 1.

FIG. 13 shows a frame structure constructed from the furniture-assembly kit 1 as a three-dimensional supporting tubular structure. In this case, the frame structure comprises four ladders, each of which is formed from a floor ladder 2 and two assembly ladders 5 mounted vertically thereon, each having two rungs 52. The rungs 52 of the assembly ladders 5, which are at the same height, are in each case connected to one another via two cross members 3. For this purpose, the snap-on claws 32 of the cross members 3 are installed on the rungs 52 so as to rest against the vertical supports 51 of the assembly ladders 5. At the same time, a plurality wind bracings 4 are connected diagonally or obliquely with rungs 52 at two different heights.

Providing the cross members 3 together with the wind bracings 4 on the ladders 2, 5 makes the frame structure extremely robust and rigid. In particular, they can absorb comparatively large loads in this way. The upper ends of the tube portions 51 of the uppermost assembly ladders 5 are covered and closed with lids 6.

Although the invention is illustrated and described in detail by means of the figures and the accompanying description, such illustration and detailed description are to be understood as illustrative and exemplary and do not limit the invention. In order not to obscure the invention, well-known structures and techniques may not be shown and described in detail in certain cases. It is understood that a person skilled in the art can make changes and modifications without departing from the scope of the following claims. In particular, the present invention covers further exemplary embodiments with any combinations of features that may deviate from the explicitly described feature combinations. For example, the invention can also be implemented or used in the following form:

The cross-braces can also be used for the horizontal connection of floor ladders or assembly ladders. In this case, they can replace the cross members and serve, for example, for supporting other components.

The furniture-assembly kit can be implemented without cross members, wherein the cross-braces assume the function of the cross members. For example, the furniture-assembly kit can comprise cross-braces of different lengths.

The present disclosure also includes embodiments having any combination of features that are mentioned or shown above or below with respect to various embodiments. It also includes individual features in the figures, even if they are shown there in connection with other features and/or are not mentioned above or below. Alternatives of embodiments described in the figures and the description and individual alternatives of their features can also be excluded from the subject matter of the invention or from the disclosed subject matter. The disclosure includes embodiments comprising exclusively the features described in the claims or in the exemplary embodiments and those comprising additional features.

Furthermore, the expression "comprise" and derivations thereof do not exclude other elements or steps. Likewise, the indefinite article "a" or "an" and derivations thereof do not exclude a plurality. The functions of several features listed in the claims can be performed by one unit or one step. The terms "substantially," "approximately," "about" and the like, when used in conjunction with a property or value, in particular also define precisely that property or that value. The terms "approximately" and "about," when used in connection with a given numerical value or range, can refer to a value or range that is within 20%, within 10%, within 5% or within 2% of the given value or range.

LIST OF REFERENCE SIGNS 1 furniture-assembly kit
2 floor ladder
22 rungs
21 vertical supports
3 cross member
4 cross-brace
41 rod portion
411 rod portion fastening openings
42 claw
42a claw upper side
42b claw lower side
421 claw base
4211 upper side base fastening portion
4212 lower side base fastening portion
4213 upper side base longitudinal opening
4214 lower side base longitudinal opening
4215 support wall
4216 fastening openings
4217 bearing portion for spring element/pressure pin
4218 upper side rack portion
4219 lower side rack portion
422 first grip-around portion
4221 lower side of the first grip-around portion
4222 upper side of the first grip-around portion
4223 rear extension of the first grip-around portion
4224 free end of the first grip-around portion
423 second grip-around portion
4231 free end of the second grip-around portion
4232 rear extension of the second grip-around portion
4233 inside chamfer
4234 outside chamfer
424 arresting element
4241 upper pinion portion
4242 lower pinion portion
4243 cylindrical body portion
425 spring element/pressure pin
4521 pressure head
426 spring
427 fastening means of the first grip-around portion
5 assembly ladder
52 rungs
6 lid
7 fastening means (claw/rod portion)
A detailed view
$F_D$ compressive force
$F_R$ restoring force
$K_1$ contact point
$K_2$ contact point
$K_3$ contact point
$M_H$ holding torque
$M_S$ closing torque
S gap
W tool interface
$X_L$ claw longitudinal axis
$X_S$ pivot axis

What is claimed is:

1. A cross-brace comprising:
an elongate rod portion; and
two claws,
wherein the rod portion has two substantially opposite longitudinal ends,
wherein the two claws
are each arranged on one of the two longitudinal ends of the rod portion, comprise a base having a longitudinal axis a first grip-around portion extending from the base and having a free end, a second grip-around portion extending from the base and having a free end, and an arresting mechanism, and are designed to grip around a rod-form element, and wherein for each of the two claws, the second grip-around_portion can be moved relative to the first grip-around portion between an open position, in which the rod-form element can be accommodated by the claw, or can be removed from the claw, and a closed position, in which the claw can grip around the rod-form element, the first grip-around portion and the second grip-around portion are designed here such that they grip around the rod-form element in the closed position in such a manner that a gap remains between the free end of the first grip-around portion and the free end of the second grip-around portion, and the arresting mechanism is designed to keep the first grip-around portion and the second grip-around portion in the closed position such that in the closed position the claws cannot be opened without the use of a tool.

2. The cross-brace according to claim 1, wherein, for each of the two claws, the first grip-around portion is designed so as to be stationary relative to the base as a fixed grip-around portion.

3. The cross-brace according to claim 1, wherein, for each of the two claws, the second grip-around portion is mounted on the base so as to be pivotable about a pivot axis.

4. The cross-brace according to claim 3, wherein, for each of the two claws, the second grip-around portion has a rear extension that, in the region of the base, can be pivoted about the pivot axis.

5. The cross-brace according to claim 4, wherein, for each of the two claws, the arresting mechanism in the closed position presses on the rear extension of the second grip-around portion in such a way that a holding torque acts about the pivot axis in the direction of the closed position.

6. The cross-brace according to claim 5, wherein, for each of the two claws, the arresting mechanism comprises a longitudinal opening formed in the base and an arresting element movably mounted in the opening of the base, along with a spring element mounted on the base, which spring element presses the arresting element toward a front end of the longitudinal opening of the base.

7. The cross-brace according to claim 6, wherein, for each of the two claws, the arresting element of the arresting mechanism has a pinion portion and a cylindrical body portion.

8. The cross-brace according to claim 7, wherein, for each of the two claws, the longitudinal opening of the base has a rack portion corresponding to the pinion portion of the arresting element.

9. The cross-brace according to claim 7, wherein, for each of the two claws, a support wall for the cylindrical body portion of the arresting element is provided on the base.

10. The cross-brace according to claim 4, wherein, for each of the two claws, the rear extension of the second grip-around portion has a chamfer on its inner side facing the longitudinal axis in the closed position.

11. The cross-brace according to claim 4, wherein, for each of the two claws, the arresting mechanism is designed in such a way that, in the open position, a compressive force acts on the rear extension of the second grip-around portion in the open position thereof, such that the second grip-around portion is resiliently held in the open position.

12. The cross-brace according to claim 11, wherein, for each of the two claws, the first grip-around portion and the second grip-around portion can be brought from the open position to the closed position without tools by pressing an arresting element of the arresting mechanism counter to the compressive force in the direction of a rear end of the longitudinal opening.

13. The cross-brace according to claim 4, wherein, for each of the two claws, the rear extension of the second grip-around portion has a bevel on its outer side facing away from the longitudinal axis in the closed position.

14. The cross-brace according to claim 1, wherein, for each of the two claws, the first grip-around portion is designed to grip around more than half of the rod-form element.

15. The cross-brace according to claim 1, wherein, for each of the two claws, the first grip-around portion and the second grip-around portion are designed in such a way that they rest against the rod-form element at three contact points when the first grip-around portion and the second grip-around portion grip around the rod-form element are in the closed position.

16. The cross-brace according to claim 1, wherein the gap (S) between the free end of the first grip-around portion and the free end of the second grip-around portion comprises between approximately 1% and approximately 20% of the circumference of the rod-form element.

17. The cross-brace according to claim 6, wherein the arresting element has a tool holder for actuating the arresting mechanism from the closed position to the open position.

18. A furniture-assembly kit comprising:
a set of floor ladders, each comprising two vertical supports connected to one another via an upper rung and a lower rung, wherein the two vertical supports are each equipped with a foot for positioning on a floor;
a set of longitudinal cross members, each of which is equipped at its longitudinal ends with a snap-on claw designed to be installed without tools on one of the rungs of one of the floor ladders; and
a cross-brace according to claim 1, wherein the claws of the cross-brace are each designed such that one of the rungs of the floor ladders or one of the cross members is the rod-form element.

19. The cross-brace according to claim 1, wherein the gap between the free end of the first grip-around portion and the free end of the second grip-around portion comprises between approximately 2% and approximately 15% of the circumference of the rod-form element.

* * * * *